US009589385B1

(12) United States Patent
Zheng et al.

(10) Patent No.: US 9,589,385 B1
(45) Date of Patent: *Mar. 7, 2017

(54) METHOD OF ANNOTATION ACROSS DIFFERENT LOCATIONS

(71) Applicant: Google Inc., Mountain View, CA (US)

(72) Inventors: Wentao Zheng, Jersey City, NJ (US); Kenneth James Turner, Queensland (AU)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/738,093

(22) Filed: Jun. 12, 2015

Related U.S. Application Data

(63) Continuation of application No. 13/550,222, filed on Jul. 16, 2012, now Pat. No. 9,087,401.

(51) Int. Cl.
*G06T 19/00* (2011.01)
*G06T 15/00* (2011.01)
*G06T 15/20* (2011.01)

(52) U.S. Cl.
CPC ............ *G06T 15/00* (2013.01); *G06T 19/006* (2013.01); *G06T 15/205* (2013.01)

(58) Field of Classification Search
None
See application file for complete search history.

(56) References Cited

U.S. PATENT DOCUMENTS

| 6,137,491 A | 10/2000 | Szeliski |
| 6,912,293 B1 | 6/2005 | Korobkin |
| 8,369,610 B1 | 2/2013 | Korobkin |
| 8,798,965 B2 | 8/2014 | Quan et al. |
| 2005/0116931 A1 | 6/2005 | Olbrich |
| 2007/0110338 A1 | 5/2007 | Snavely et al. |
| 2007/0238520 A1 | 10/2007 | Kacmarcik |
| 2010/0067865 A1 | 3/2010 | Saxena et al. |
| 2010/0214284 A1 | 8/2010 | Rieffel et al. |
| 2012/0155778 A1 | 6/2012 | Buchmueller et al. |
| 2012/0169734 A1 | 7/2012 | Snavely et al. |
| 2013/0249906 A1 | 9/2013 | Gunderson et al. |

*Primary Examiner* — Ryan M Gray
(74) *Attorney, Agent, or Firm* — Lerner, David, Littenberg, Krumholz & Mentlik, LLP

(57) ABSTRACT

A computer-implemented method, system and computer-readable storage device provide functionality for managing location information for planar regions in two-dimensional views of a three-dimensional environment. A request is received for a first two-dimensional view of a three-dimensional environment that identifies a first planar region associated with content within the three-dimensional environment. The first two-dimensional view is rendered and displayed. A request is received for a second two-dimensional view from a second location. A distance and direction between the location of the first planar region and the location for the second view are determined and used to establish a second location of the planar region in the second two-dimensional view, and then use this information to help render and display the second two-dimensional view.

9 Claims, 9 Drawing Sheets
(6 of 9 Drawing Sheet(s) Filed in Color)

510A Annotated Billboard

510B Annotated Billboard (Updated)

METHOD OF ANNOTATION ACROSS DIFFERENT LOCATIONS

BACKGROUND

Cross Reference

The present application is a continuation, of U.S. patent application Ser. No. 13/550,222, filed Jul. 16, 2012, the disclosure of which is incorporated herein by reference.

The field relates to techniques for managing location information in two-dimensional views of a three-dimensional environment.

BACKGROUND

Various products provide access to virtual three-dimensional environments by rendering two-dimensional views of those three-dimensional environments as a user navigates through the environment. For example, the virtual environments might enable a user to explore a virtual simulation of Times Square in New York City, N.Y. Within an environment, there may be areas that include dynamic content.

For example, in a simulation of Times Square, a goal of the simulation might be to provide views of a billboard that includes changing content. In order to represent the changes to the billboard, image or video data may be obtained and integrated into two-dimensional views of the three-dimensional environment as the billboard displays advertisements.

BRIEF SUMMARY

A computer-implemented method, system, and computer-readable storage device are provided for managing location information for planar regions in two-dimensional views of a three-dimensional environment. A request is received for a first two-dimensional view of a three-dimensional environment from a first location in the three-dimensional environment, wherein the request for the first two-dimensional view identifies the location of a first planar region associated with content within the three-dimensional environment. The first two-dimensional view from the first location in the three-dimensional environment is rendered based on a plurality of images of the three-dimensional environment and metadata associated with the plurality of images. The first two-dimensional view is displayed. A request is received for a second two-dimensional view of the first planar region from a second location in the three-dimensional environment. A distance and a direction between the second location and the location of the first planar region are determined. Based on the distance and the direction between the second location and the location of the first planar region in the three-dimensional environment, corner points of a second planar region within the second two-dimensional view that correspond to respective corner points of the first planar region are identified. The second two-dimensional view from the second location in the three-dimensional environment is rendered based on a plurality of images of the three-dimensional environment, metadata associated with the plurality of images, and the content associated with the planar region in the three-dimensional environment. The second two-dimensional view is displayed.

Further embodiments, features, and advantages of the embodiments, as well as the structure and operation of the various embodiments are described in detail below with reference to accompanying drawings.

BRIEF DESCRIPTION OF THE FIGURES

The patent or application file contains at least one drawing executed in color. Copies of this patent or patent application with color drawing(s) will be provided by the Office upon request and payment of the necessary fee.

The accompanying drawings, which are incorporated herein and form a part of the specification, illustrate the present embodiments and, together with the description, further serve to explain the principles of the embodiments and to enable a person skilled in the pertinent art to make and use the embodiments.

FIG. 7B is a related screenshot of the use case of FIG. 7A.

The drawing in which an element first appears is typically indicated by the leftmost digit or digits in the corresponding reference number. In the drawings, like reference numbers may indicate identical or functionally similar elements.

DETAILED DESCRIPTION OF EMBODIMENTS

Figure 1:
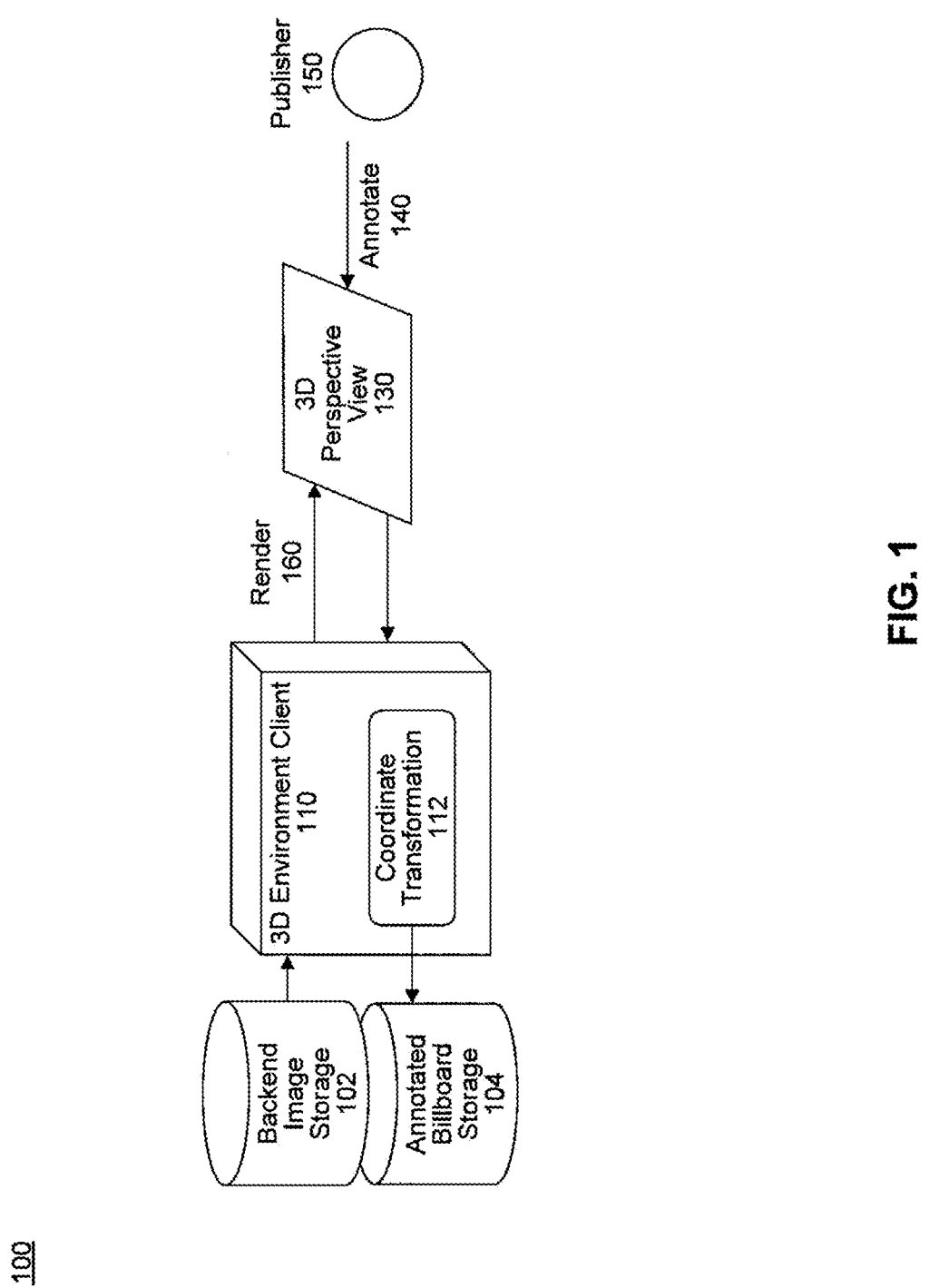
FIG. 1 is a diagram illustrating overall data flow through an example system.

In the detailed description of embodiments that follows, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Embodiments may simulate a three-dimensional environment by combining several types of information about the environment. For example, constructing a simulation might begin with an assortment of images of the area to be simulated. Such an assortment of images may include images of a variety of views of the area, from multiple perspectives.

Additionally, embodiments may use metadata stored with the images to provide context that may be used when simulating a virtual three-dimensional environment. Such metadata might associate information with an image such as where it was captured and/or information about camera parameters when the image was captured (for example, zoom, orientation, etc.)

By processing the images and the metadata, the virtual environment generates panoramic images of various views of the environment. The processing uses geometric techniques and image analysis to deduce three-dimensional properties of the environment from the images and the metadata. Given multiple views of the same building and metadata about where those views were obtained, the virtual environment becomes able to infer information about the three-dimensional shape of the building. Additionally, the three-dimensional environment can determine what the various faces of the building look like. These inferences are possible because each image provides a two-dimensional view of the three-dimensional environment and the metadata provides information about what parts of the three-dimensional environment are visible from that image. Given a sufficient number of images and sufficient metadata associated with those images, it is possible to deduce information about the contents of the three-dimensional environment. The knowledge that the three-dimensional environment has a certain two-dimensional appearance from a set of known perspectives allows the three-dimensional environment to arrive at conclusions about the contents of the three-dimensional environment.

For example, the images and their metadata may provide perspectives of a building from different viewpoints. The metadata provides the ability to identify where the building should appear from the different viewpoints and what shape the building takes. By techniques such as triangulation and edge detection, the analysis allows the three-dimensional environment to define the building as a three-dimensional solid and also generate useful information about what the sides of the solid look like. Based on this information, it becomes possible to render images of the environment based on the inferred shapes of the buildings as well as the inferred information about what the building looks like.

Based on this type of analysis, it is possible to generate panoramic images of the environment. Subsequently, based on these panoramic images, the panoramas can be transformed and rendered to provide a user of the environment with a rendered view of the three-dimensional environment that represents what the user should be able to see, based on his or her location and orientation within the virtual environment.

However, current approaches to managing two-dimensional views of three-dimensional environments do not include effective ways of managing location information for planar regions (such as billboards) in two-dimensional views of a three-dimensional environment. Such a capability is important in updating content for these planar regions when providing different views of these planar regions to users of the simulation.

Thus, some embodiments receive information about the location of a planar region with dynamic content in one two-dimensional view of a three-dimensional environment from a first location, such as by annotation. Subsequently, some embodiments may provide rendered views of that planar region from a second location in the three-dimensional environment. This ability extends the capabilities of virtual three-dimensional environments in a new and useful way by helping to manage locations of such planar regions when rendering views of the environment.

For example, the planar region may be a billboard with a video ad for a product. A user may obtain a first two-dimensional view of the billboard from a first location and orientation. Subsequently, the same user (or another user) may want to see the same planar region, but from a different location and orientation. Embodiments provide the ability to ensure that once the planar region has been identified in the context of the first two-dimensional view, content associated with that planar region can subsequently easily be incorporated into subsequent views of the planar region.

In some embodiments, a user identifies the location of the planar region of interest included in a requested two-dimensional view of the three-dimensional environment. For example, a user may request a first two-dimensional view of the three-dimensional environment from one location (this location may be referred to as the origin.) As part of the requesting process, the user may identify a planar region of interest.

One way in which the planar region may be identified is to receive annotations that indicate boundaries of the planar region in the context of the first two-dimensional view. These annotations will be discussed in greater detail in connection with the figures, below. The annotations help to establish the location of the planar region that is associated with dynamic content in the context of the three-dimensional environment. The annotations may, for example, include identification of corner points or edge boundaries of the planar region. However, these annotations represent the corners or edges of the planar region in the context of the view of the billboard from the first two-dimensional view. The received identifying information can then be used to establish where the billboard is located in three-dimensional space.

Once the billboard is annotated and the origin is established, various steps may be taken to manage the location of the billboard in the three-dimensional environment. While the discussion below discusses an embodiment in which the boundaries of the billboard are defined based on annotations of corner points, it will be recognized that other ways to identify the location of the billboard may be used in other embodiments (such as marking billboard edges).

For example, some embodiments may proceed as follows (this method will be discussed in greater detail, below.) First, after the billboard (or other planar region) is annotated, the two-dimensional boundaries of the billboard in the context of the panorama from the first location is transformed into corresponding locations of corners and/or boundaries of the billboard in the three-dimensional environment. Second, the visibility from a second location of the billboard is established by processing information about the relative position of the second location and the billboard in the environment, as well as other contents of the environment that may occlude the view of the billboard. Third, based on the second location, the two-dimensional boundaries of the planar region is established within the two-dimensional view from the second location. As an optional step, partial matching techniques may be used to manage billboard information if only part of the billboard is visible, such as may occur due to an indirect or occluded view. Finally, once the boundaries of the billboard have been established, this new location information is used to render a second view that incorporates the previously determined information about the billboard.

Various aspects of how embodiments operate will now be discussed in greater detail with reference to the figures.

FIG. 1 is a diagram illustrating overall data flow through an example system. FIG. 100 shows how parts of a three-dimensional environment simulation system interact, in an embodiment. For example, a 3D environment client 110 may receive a series of images from a backend image storage 102. These images can be combined and analyzed at 3D environment client 110 and used to render an intermediate 3D perspective view 130 for 3D environment client 110. 3D perspective view 130 provides a view of the three-dimensional environment from a viewpoint associated with 3D environment client 110. For example, publisher 150 may subsequently annotate 140 3D perspective view 130. As discussed, the annotation process involves identifying where a planar region of interest is located in 3D perspective view 130. The annotation process may involve annotating corners of the planar region of interest.

Annotated 3D perspective view 130 is returned to 3D environment client 110. 3D environment client 110 then applies coordinate transformation 112 to store the result of the processing in annotated billboard storage 104. Coordinate transformation 112 begins with 3D perspective view 130 that is a two-dimensional view from one viewpoint in the three-dimensional environment with annotations that establish the location of the billboard. Coordinate transformation 112 takes the two-dimensional coordinates of the annotations, and transforms them to provide transformed coordinates that correspond with three-dimensional coordinates in the actual environment. These three-dimensional coordinates may then be stored in annotated billboard storage 104, so that subsequent requests may access this information about the annotations to ascertain billboard visibility.

Coordinate transformation 112 transforms the two-dimensional coordinates into the three-dimensional coordinates in the environment to which they correspond by analytic techniques discussed above that use information from back-end image storage 102 data repository to infer appropriate three-dimensional coordinates to be stored in annotated billboard storage 104. This process can essentially be performed in reverse, subsequently, when incorporating the information from annotated billboard storage 104 while rendering a second two-dimensional view. This approach permits the billboard to be represented appropriately in the rendered version of the second two-dimensional view.

Thus, FIG. 1 illustrates preliminary data flow related to the operation of embodiments. FIG. 1 illustrates how a first view may be constructed, provided to a publisher for annotations, and subsequently processed to manage location data associated with annotated billboards 104. In embodiments, two-dimensional coordinates from a first view are transformed into three-dimensional coordinates in a three-dimensional environment. These three-dimensional coordinates are then transformed into two-dimensional coordinates from a second view. In this manner, billboard annotation locations can be automatically transferred from view to view.

Figure 2:
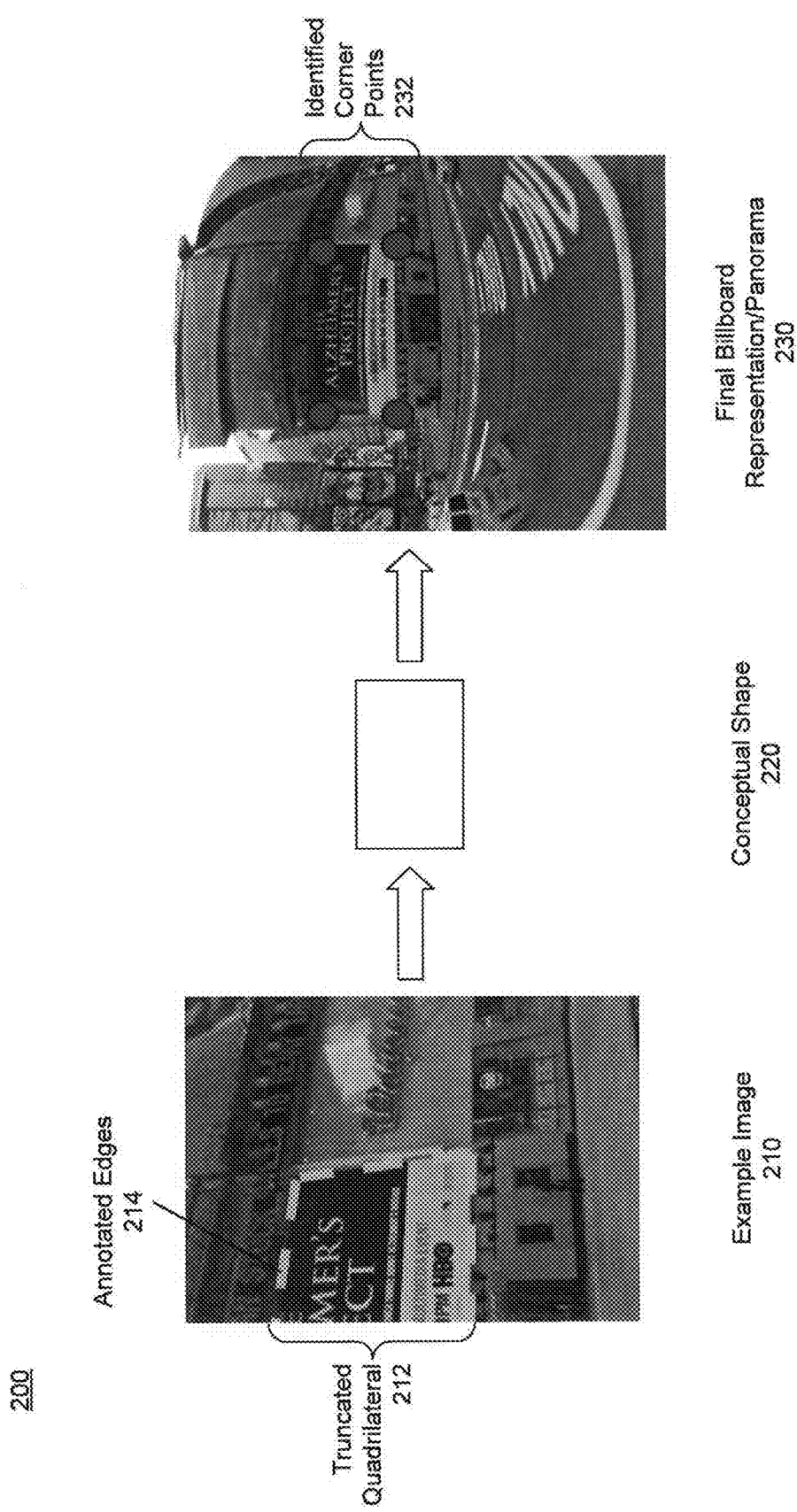
FIG. 2 is an illustration of various stages in an example use case.

FIG. 2 is an illustration of various stages in an example use case. Embodiments may begin with one or more images of a billboard. For example, example image 210 includes a partial view of a billboard. Example image 210 is a truncated quadrilateral 212 because the annotated image is not directly facing the billboard and only sees part of the billboard. However, the user has indicated annotated edges 214 of the billboard. It may be noted that example image 210 by itself may be insufficient to give enough information to properly define the billboard in three dimensions. Additional images of the billboard may be necessary to completely define the billboard. For example, it may be necessary to have an image of the left side of the billboard.

Subsequently, embodiments identify a conceptual shape 220. Based on the operation of this embodiment, the conceptual shape 220 is chosen to be a rectangle. Embodiments may combine information from example image 210 and other images of the billboard based on conceptual shape 220 when analyzing the images. The use of conceptual shape 220 helps to facilitate this analysis by incorporating the knowledge that the billboard is in fact rectangular, although the billboard may be distorted when it is not viewed directly, as in example image 210.

After the annotation of example image 210 has been received (as well as any other necessary images), for example from publisher 150 as in FIG. 1, the three-dimensional modeling environment uses the conceptual shape 220, as well as information derived in annotating example image 210, in order to generate a final billboard representation/panorama 230. For example, consideration of the annotated edges 214 allows derivation of the identified corner points 232. A variety of analysis techniques may be used to perform image analysis of the images used to annotate example image 210 in combination with the information from conceptual shape 220. For example, techniques of projective geometry may use example image 210 itself, metadata associated with example image 210, and any other annotated images and metadata associated with them to establish where the billboard is located. Since conceptual shape 220 is a rectangle, it becomes possible to infer certain things, such as that the opposite sides of the rectangle are parallel and adjacent sides are perpendicular.

Based on this analysis, a final billboard representation/panorama 230 can be generated. For example, final billboard representation/panorama 230 shown in FIG. 2 shows a head-on view of the annotated billboard, but from a perspective that is farther away from the billboard (or zoomed out). Thus, FIG. 2 illustrates a process in which annotations can be combined with conceptual shapes to manage views of the same billboard from different viewpoints.

Figure 3:
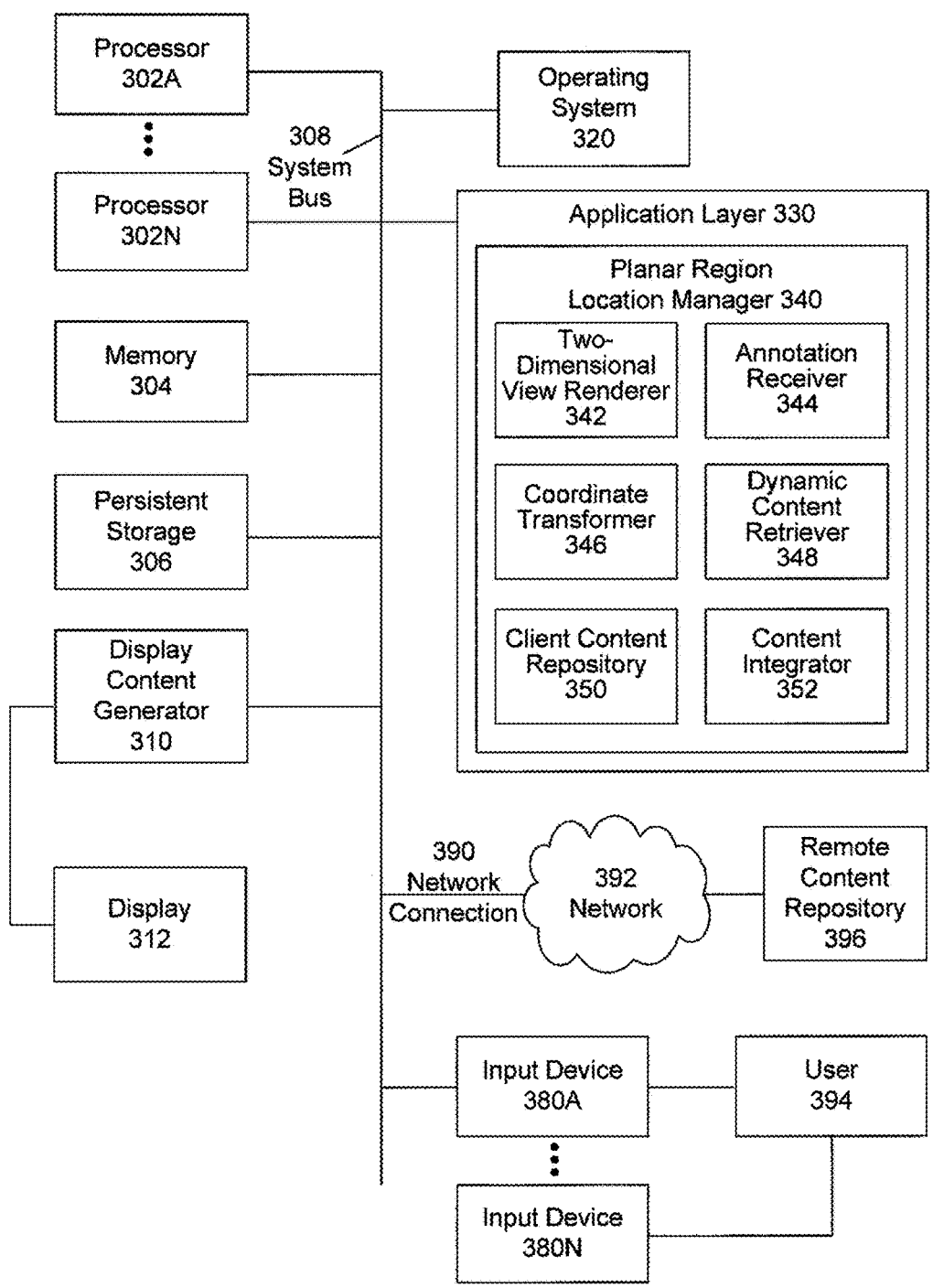
FIG. 3 is a diagram illustrating an example system, according to an embodiment.

FIG. 3 is a diagram illustrating an example system, according to an embodiment.

A computer system 300 manages location information for planar regions in two-dimensional views of a three-dimensional environment.

Each of the constituent parts of a system embodiment may be implemented on any computer system 300. Such computer system 300 can include, but is not limited to, a personal computer, mobile device such as a mobile phone, workstation, embedded system, game console, television, set-top box, or any other computer system 300. Further, computer system 300 can include, but is not limited to, a device having a processor and memory for executing and storing instructions. Software may include one or more applications and an operating system. Hardware can include, but is not limited to, a processor, memory and graphical user interface display. Computer system 300 may also have multiple processors and multiple shared or separate memory components. For example, computer system 300 may be a clustered computing environment or a server farm.

Computer system 300 is coupled to a display 312 that displays content from display content generator 310 on behalf of computer system 300. Display content generator 310 generates content that, when displayed, facilitates interaction between a user 394 and the remainder of computer system 300. For example, display content generator 310 may provide a Graphical User Interface (GUI) to user 394. Additionally, computer system 300 is communicatively coupled to one or more input devices such as 380A-380N that can receive one or more inputs (e.g., touch inputs, keyed inputs, etc.) from user 394.

Modules or instructions that constitute operative parts of embodiments may utilize any type of structured memory, including a persistent memory. In some embodiments, each data storage infrastructure may be implemented as a relational database.

It should be noted that computer-readable storage medium or device embodiments may include any physical medium which is capable of having instructions encoded thereon that may subsequently be used by a processor to implement methods described herein. Example physical media may include floppy discs, optical discs (e.g. CDs, mini-CDs, DVDs, HD-DVD, Blu-ray), hard drives, punch cards, tape drives, flash memory, and memory chips (such as RAM). However, any other type of tangible, persistent storage that can serve in the role of providing instructions to a processor may be used to store the instructions in these embodiments.

Processing tasks in the embodiment of FIG. 3 are carried out by one or more processors 302A-302N. It should be noted that any type of processing technology may be used here, including multi-core processors, multiple processors, or distributed processors. In order to manipulate data, processors 302A-302N access a memory 304 via system bus 308. For data that needs to be stored more permanently, processors 302A-302N access persistent storage 306. Processors 302A-302N, memory 304 and persistent storage 306 operate in conjunction with operating system 320 to provide basic functionality for computer system 300. Operating system 320 provides support functionality for an application layer 330. In the context of applications layer 330, computer system 300 hosts a planar region location manager 340.

Planar region location manager 340 in application layer 330 may have access to the Web over a network 392 via a network connection 390. The network 392 may additionally provide access to remote content repository 396. For example, remote content repository 396 may include data repositories used in managing information for the three-dimensional simulation. For example, some embodiments may provide access to information repositories, already presented in the context of FIG. 1, that include backend image storage 102 and annotated billboard storage 104. Such information repositories may be hosted locally, such as client content repository 350, remotely, such as remote content repository 396, or by a combination of these options.

Computer system 300 may be a computer such as a desktop or laptop PC, but it may additionally be any device with one or more processors 302A-302N and memory 304 such as a game console, a tablet, a netbook or a smartphone that can perform functionality to manage location information for planar regions in two-dimensional views of a three-dimensional environment. Computer system 300 as shown in FIG. 3 may be organized around a system bus 308, but any type of infrastructure that allows the infrastructural elements of computer system 300 to communicate with and interact with each other may be used to function as this part of computer system 300.

Computer system 300 may use network connection 390 to communicate with other processing machines via network 392. Network connection 390 may be a wired connection such as Ethernet, token ring, or optical, DSL, cable, or phone connections in conjunction with an appropriate modem. Alternatively, appropriate wireless technology may be used to act as network connection 390 to access network 392. Network 392 may be the Internet, a local area network, or any other network 392 of machines with which computer system 300 may exchange data.

Planar region location manager 340 within application layer 330 may include a variety of constituent subsystems. The subsystems of planar region location manager 340 may operate in conjunction with other parts of computer system 300 (such as processors 302A-302N, memory 304, and persistent storage 306). This interaction between the subsystems of planar region location manager 340 allows manager 340 to provide functionality related to managing location information in two-dimensional views of a three-dimensional environment. While this functionality may be automated, it may also potentially involve user interaction through producing display content and receiving inputs. Such display content is generated at display content generator 310, and is displayed at display 312 to user 394. User 394 may interact with various components of computer system 300 by providing inputs at input devices 380A-380N.

The subsystems included in planar region location manager 340 may include a variety of functional units and modules that work together to provide the functionality of embodiments. These may include a two-dimensional view renderer 342, an annotation receiver 344, a coordinate transformer 346, a dynamic content retriever 348, a client content repository 350, and a content integrator 352.

The structures and functions of these subsystems will now be discussed in greater detail. It may be noted that not every embodiment may include all of these subsystems. Additional subsystems may be present in certain embodiments to help perform the functionality of such embodiments.

The basic tasks involved in managing location information for planar regions in two-dimensional views of a three-dimensional environment are performed by the above subsystems. User 394 requests that planar region location manager 340 render a first two-dimensional view from a given location. Additionally, two-dimensional view renderer 342 and annotation receiver 344 allow user 394 to identify where a planar region associated with content of interest is located within the three-dimensional region. For example, planar region location manager 340 may allow user 394 to provide corner points or identify edges that will establish the original location of the planar region.

Two-dimensional view renderer 342 then renders the two-dimensional view. The rendering may be based on information about the planar region that is found locally at client content repository 350 and/or remote content repository 396). The rendered view information is sent to display content generator 310. Display content generator displays that initial view to user 394 on display 312. Some embodiments allow that user or another user to view the identified planar region from another location.

Later, the planar region location manager 340 receives a request for a two-dimensional view of the planar region. However, this second two-dimensional view may be from a second location in the three-dimensional environment (which is a new origin). Coordinate transformer 346 establishes a distance and a direction between the second location and the location of the planar region (in the three-dimensional environment). Then, coordinate transformer 346 uses two-dimensional view renderer 342, dynamic content retriever 348, client content repository 350 and/or remote content repository 396, as well as content integrator 352, to render a new two-dimensional view of the planar region from the new origin.

More detail about system embodiments, as well as more advanced features, will now be presented below in connection with discussion of several method embodiments.

Overview of the Method

Figure 4:
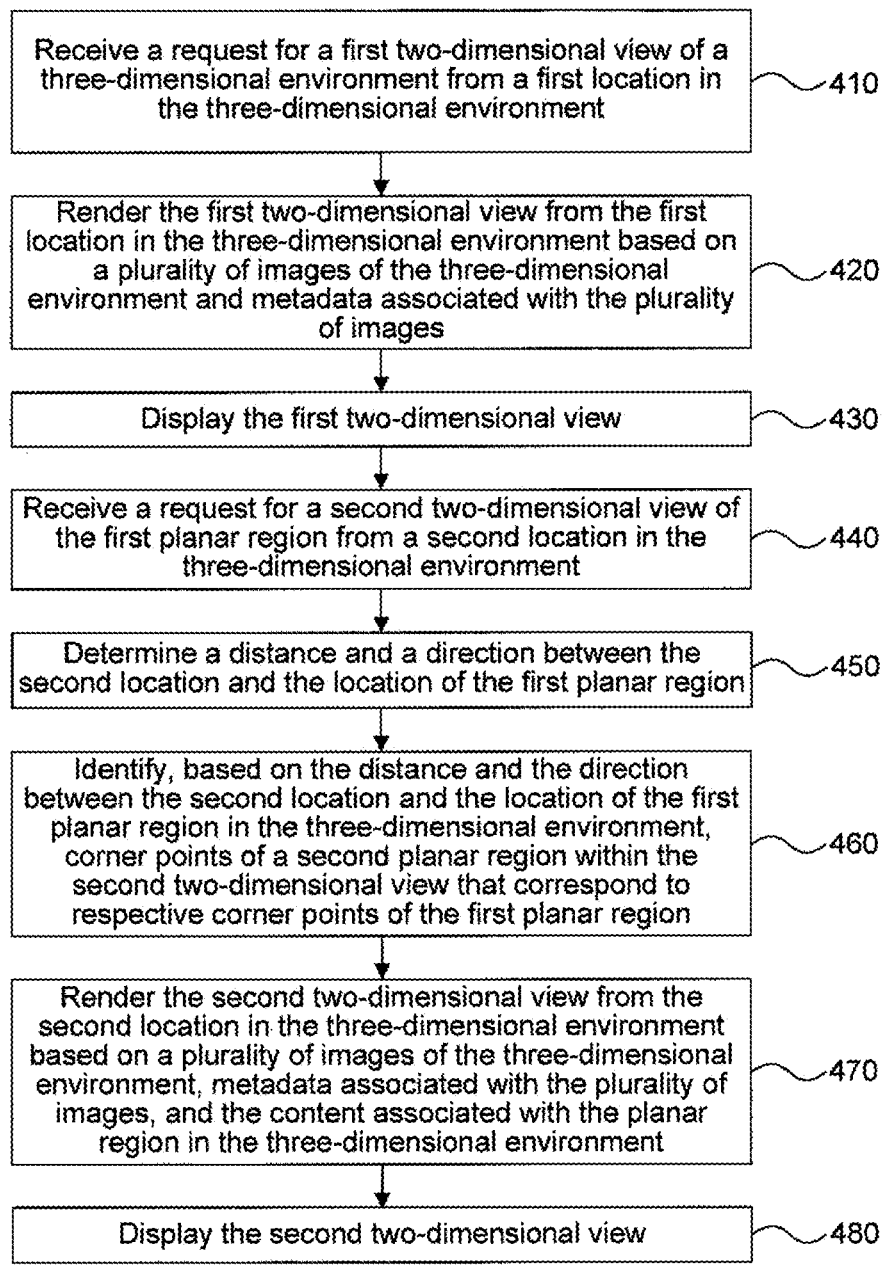
FIG. 4 is a flowchart of a method, according to an embodiment.

FIG. 4 is a flowchart of a method, according to an embodiment.

In stage 410, a request is received for a first two-dimensional view of a three-dimensional environment from a first location in the three-dimensional environment, wherein the request for the first two-dimensional view identifies the location of a first planar region associated with content within the three-dimensional environment. For example, user 394 may use one or more input devices 380A . . . 380N to communicate with planar region location manager 340. User 394 may provide planar region location manager 340 with information about the initial perspective of the three-dimensional environment. This information about the initial perspective of the three-dimensional environment may include information about parameters that are associated with the initial perspective. Such parameters may include the location (origin) associated with the initial perspective, as well as other factors such as the direction associated with the initial perspective.

One of the subsystems of planar region location manager 340, annotation receiver 344, may allow user 394 to establish information that identifies the location of a planar region within the two-dimensional view of the three-dimensional environment. For example, annotation receiver 344 may receive input that identifies the corners of the first planar region. However, annotation receiver 344 may also receive other inputs that identify the location of the first planar region. For example user 394 may provide identifying edges or other sufficient information to annotation receiver 344. As discussed above, part of the identifying information may include information about a conceptual shape 220 associated with the first planar region that may establish that it is a specific shape, such as a rectangle. However, embodiments are not limited to planar regions that are rectangles, and other shapes may be used in various embodiments.

In stage 420, the first two-dimensional view from the first location in the three-dimensional environment is rendered based on a plurality of images of the three-dimensional environment and metadata associated with the plurality of images. Two-dimensional view renderer 342 may render a two-dimensional view of the three-dimensional environment, based on the information provided to planar region location manager 340. For example, client content repository 350 or remote content repository 396 may provide a plurality of images of the three-dimensional environment and metadata associated with the plurality of images. Various photogrammetry techniques allow analysis of this information. The metadata may include information about camera parameters and source locations associated with the images. Embodiments process this information to support a virtual tour of a three-dimensional environment.

The information received in stage 410 allows two-dimensional view renderer 342 to establish a relevant viewpoint (that is, origin and orientation) for generating the first-dimensional view. Based on this information, a first two-dimensional view is generated. Additionally, in this stage a view of the first planar region is integrated into the first two-dimensional view, based on the identifying information for the region that was provided in stage 410. Incorporating content from the planar region into the two-dimensional views will be discussed further, below.

In stage 430, the first two-dimensional view is displayed. The first two-dimensional view is generated within planar region location manager 340 by two-dimensional view renderer 342 during stage 420. Displaying the image may involve transmitting the graphic of the two-dimensional view to display content generator 310. Display content generator 310 provides the two-dimensional view to display 312 for display. Stage 430 provides a tangible result that is responsive to the initial request for a view of the three-dimensional environment. This view may subsequently serve as a baseline and a reference point of what the three-dimensional environment looks like from the first location to help differentiate the first two-dimensional view from the second two-dimensional view that is generated in the subsequent stages of the method.

In stage 440, a request is received for a second two-dimensional view of the first planar region from a second location in the three-dimensional environment. This request may be from the original user 394. However, the second two-dimensional view may also be requested by another user. The request for the second two-dimensional view is similar to the request for the first two-dimensional view. However, an important difference between stage 440 and stage 410 is that annotation is not a part of stage 440. The location of the planar region is already known by stage 440. Stage 440 constructs a second two-dimensional view of the three-dimensional environment. However, stage 440 uses the annotations based on the appearance of the first planar region from a new viewpoint. Thus, in stage 440, planar region location manager 340 may receive a second location and information about the viewpoint from that second location, from which the second two-dimensional view is to be constructed.

In stage 450, a distance and a direction between the second location and the location of the first planar region are determined. The two points between which the distance and direction are determined may be (in some embodiments) the new origin and the centroid of the first planar region. This centroid can be determined mathematically, based on the boundaries, corners, and/or conceptual shape of the first planar region. Planar region location manager 340 may use coordinate transformer 346 to accomplish this stage. Coordinate transformer 346 may use the results of earlier stages to change the second location and the location of the centroid of the first planar region into three-dimensional coordinates. In an embodiment, prior to stage 450, annotation receiver 344 and coordinate transformer 346 have allowed user 394 to annotate corner points of a region in the three-dimensional environment. Appropriate processing allows coordinate transformer 346 to begin with previously annotated locations of the corner points and determine the locations of the corners of the planar region in the three-dimensional environment.

Based on these two locations (the origin for the second view and the location of the centroid of the planar region), stage 450 determines a distance and a direction between the second location and the location of the centroid of the planar region. For example, if the coordinates in three dimensional space are known, analytic geometry allows deduction of the distance and the direction. For example, the distance may be calculated from the Pythagorean theorem and the direction may the sum of three perpendicular vectors.

In stage 450, embodiments establish a relationship between locations of the planar region and the second location. In stage 460, based on the distance and the direction between the second location and the location of the first planar region in the three-dimensional environment, corner points of a second planar region within the second two-dimensional view that correspond to respective corner points of the first planar region are identified. Because the location of the planar region is known, geometric techniques allow embodiments to automatically determine where the corner points should appear in the second two-dimensional view. To accomplish this stage, coordinate transformer 346 may transform the three-dimensional coordinates into two-dimensional coordinates that are appropriate in the context of the second two-dimensional view.

In stage 470, the second two-dimensional view from the second location in the three-dimensional environment is rendered based on a plurality of images of the three-dimensional environment, metadata associated with the plurality of images, and the content associated with the planar region in the three-dimensional environment. This rendering stage is similar to that of stage 430, but these stages differ because the corner points of the planar region are known. Therefore, the rendering process responds to the fact that the contents of the planar region may have changed. Certain subsystems of planar region location manager 340, such as dynamic content retriever 348 and content integrator 352, may automatically incorporate updated content when rendering the second two-dimensional view. The second two-dimensional view may be generated within planar region location manager 340 by two-dimensional view renderer 342 during stage 470.

In stage 480, the second two-dimensional view is displayed. The display of the image may occur by transmitting the two-dimensional view to display content generator 310, which uses display 312 to display the rendered view. This stage provides a tangible product to the user that demonstrates the ability of embodiments to manage views from different locations of a billboard. Additionally, some embodiments associate changing content for the billboard.

Examples of Use

Figure 5A:
FIG. 5A is a screenshot of an example use case.

FIG. 5A is a screenshot of an example use case. FIG. 5A is a picture of an example two-dimensional view of a three-dimensional environment. In this case, the two-dimensional view is a view of several advertising billboards in Times Square in New York City, N.Y. FIG. 5A includes an annotated billboard, 510A. As can be seen, annotated billboard 510A is defined by four corner points that define a quadrilateral whose boundaries are the edges of the billboard. The billboard itself is actually rectangular. However, the viewpoint in FIG. 5A does not directly face the billboard. Hence the quadrilateral defined by the corner points is the quadrilateral that appears as the two-dimensional projection of the billboard from that perspective. Additionally, annotated billboard 510A is shaded. This shading indicates that the billboard is the planar region with which dynamic content is to be associated when viewing the billboard.

Figure 5B:
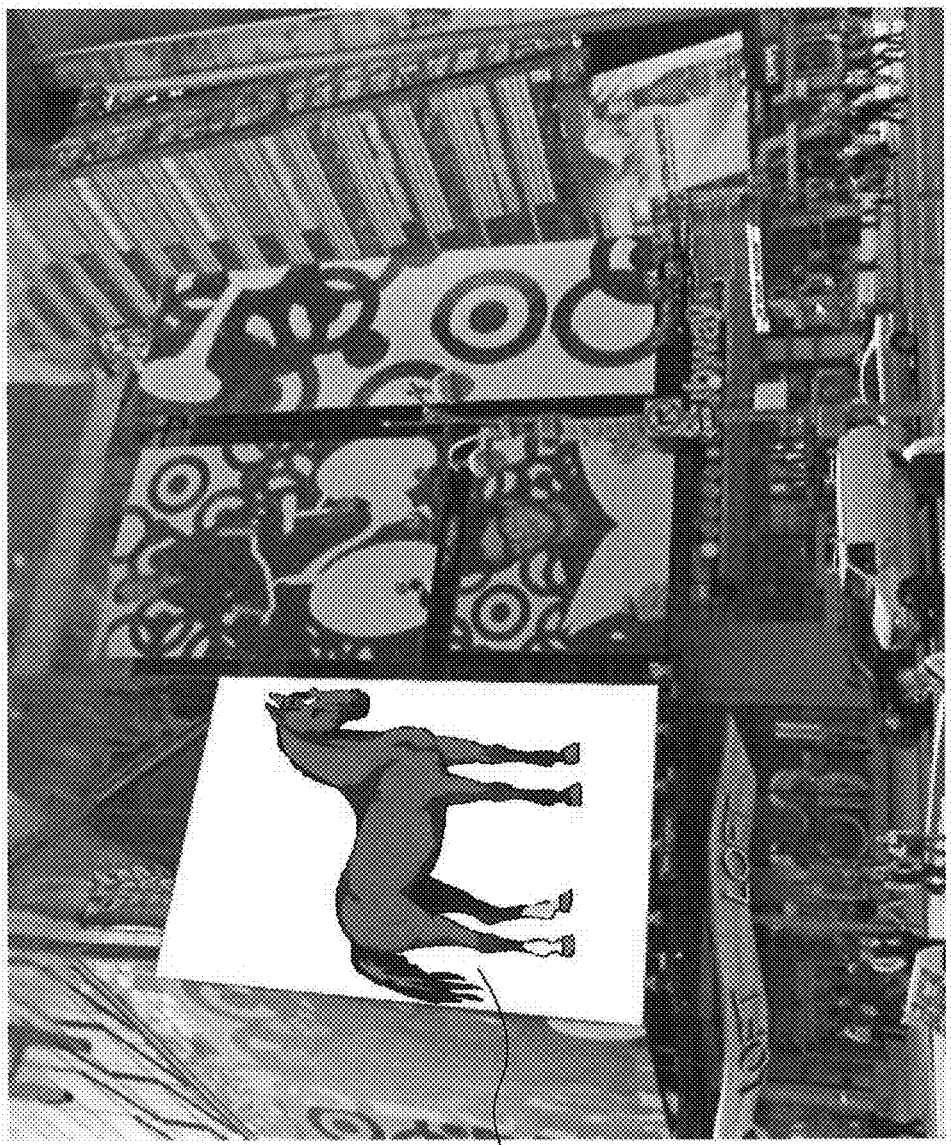
FIG. 5B is a related screenshot of the use case of FIG. 5A.

FIG. 5B is a related screenshot of the use case of FIG. 5A. FIG. 5B illustrates an aspect of embodiments in which dynamic content can be incorporated into multiple rendered views of a billboard. For example, in FIG. 5B, the billboard has been re-rendered with a new image as annotated billboard (updated) 510B. In this use case, a picture of a horse is the new image. In other examples, the new image may be a new advertisement. This example use case illustrates replacing one image of a billboard with another, updated billboard. In some embodiments, the updated content in the rendered billboard area includes content that is actually being shown on the physical billboard at a given point in time. In other embodiments, the updated content in the rendered billboard area includes content that is different from content actually displayed on the physical billboard. Some embodiments have features such that in addition to updating images of the billboard periodically, a live video feed of the billboard may be part of an embodiment. The live video may be incorporated into the views of the billboard as the billboard changes in real-time.

Furthermore, there has been a change of viewpoint between FIG. 5B and FIG. 5A. The camera has zoomed out or become more distant between the two figures, such that more of the overall scene is visible around the edges. This information is factored in when rendering FIG. 5B. This image reflects an automatic coordinate transform, in which the content of annotated billboard 510A has been refreshed with new content to provide annotated billboard (updated) 510B.

Thus, FIG. 5A and FIG. 5B illustrate two features of embodiments. First, embodiments automatically transfer annotations that establish the location of a planar region from viewpoint to viewpoint in a three-dimensional environment. Also, embodiments update images and videos within the planar region, aided by this ability to automatically update the location of the planar region from the different viewpoints.

Figure 6:
FIG. 6 is a screenshot of another example use case.

FIG. 6 is a screenshot of another example use case. FIG. 6 contains the same billboard from FIGS. 5A-5B, but the panorama is different. Once again, changes to the content displayed on matching billboard 610 have been introduced into the image. Now, the billboard includes a picture of a dog. The viewpoint has also experienced a dramatic change. The change of view may have been accomplished in a variety of ways. One possibility is that the camera is farther away and has moved to the left. Or, the camera parameters may have changed so that the camera has zoomed out and panned left. There may also have been a combination of these actions to change the viewpoint.

However, embodiments are still able to use the techniques discussed above in order to find a correspondence between annotated billboard 510A and matching billboard 610. For example, some embodiments are able to identify corner points of annotated billboard 510A. When generating the two-dimensional view of FIG. 6, some embodiments establish that the corner points for matching billboard 610 are from the same three-dimensional locations as the corner points of annotated billboard 510A. That is, the system receives an identification of one billboard, and then locates those corner points in another two-dimensional view, such that the corner points in the second two-dimensional view then match the new location of the billboard. Regardless of how the location and viewpoint change, embodiments are able to deduce the appearance of the corner points in a new view. For example, if the camera changes the zoom factor or moves closer to or father from annotated billboard 510A, embodiments may realize that these changes have occurred and respond appropriately to the adjustment.

In the matching billboard 610, the two-dimensional boundaries of the region that corresponds to the billboard in the new view have changed. However, embodiments have access to information about where the original view was obtained and with which camera parameters. Hence, if annotated billboard 510A was obtained from a distance of, e.g., 25 meters, and matching billboard 610 was obtained from a distance of, e.g., 35 meters, embodiments may use that information to associate a two-dimensional region on matching billboard 610 with updated content associated with annotated billboard 510A.

Figure 7A:
FIG. 7A is a screenshot of an example use case that illustrates partial matching.

FIG. 7A is a screenshot of an example use case that illustrates partial matching. Billboard 710A is a view of a certain location, with a certain given distance and perspective. In the view of the billboard provided in FIG. 7A, the entire billboard is visible. Because the entire billboard is visible, when annotating FIG. 7A, the location of the boundaries of the entire billboard are known prior to any partial matching.

FIG. 7B is a related screenshot of the use case of FIG. 7A. In FIG. 7B, another issue that embodiments must confront is the issue that sometimes a view of a billboard will be occluded, or the view will be an indirect view from certain perspectives. The result of these situations is that only a portion of an identified billboard will actually be visible, because portions of the identified billboard will be blocked in the other perspectives. In FIG. 7B, partially matched billboard (updated) 710B includes a view of billboard 710A in which the view is not direct, so a portion of the side of partially matched billboard (updated) 710B is not displayed because it is blocked by an obsture. Based on the angle from which partially matched billboard (updated) 710B is taken, it is still the same billboard as billboard 710A. However, only some of billboard 710A is visible from the view of FIG. 7B. Thus, FIG. 7A and FIG. 7B are an example of a situation in which a billboard is visible from the first location, but only a portion of the billboard will be matched in the second location, as only a portion of the billboard is actually still visible if a portion of the second billboard is blocked.

Further aspects of what is involved in partial matching will be discussed, below.

Additional Features

Embodiments allow identifying, based on the distance and the direction between the second location and the location of the first planar region in the three-dimensional environment, corner points of a planar region within the second two-dimensional view that correspond to respective corner points of the first planar region. Embodiments establish where the first planar region is located. When generating the second two-dimensional view, embodiments have information about the location from which the second two-dimensional view is obtained, as well as its field of view. Based on this knowledge, embodiments establish where the first planar region will appear in the second two-dimensional view.

There are various scenarios that may occur when embodiments attempt to identify corner points of the planar region. In one scenario, there is an exact match between planar regions. For example, the scenario of the exact match is illustrated in the relationships between FIG. 5A and FIG. 5B, and between FIG. 5A and FIG. 6. In this case, the originally annotated billboard in the first view is fully visible in the second view. Finding an exact match of content means that both the first planar region and the second planar region portray the same subject (although the same subject may incorporate different dynamic content at different times). It is not necessary that the first two-dimensional view and the second two-dimensional view be identical. However, they should each offer complete views of the same subject (for example, as provided between FIG. 5A and FIG. 5B.) When an exact match occurs, appropriate coordinate transforms may be performed on the corners defining the first planar region to define similar corners for the second planar region.

Other embodiments involve scenarios in which identification of the planar regions is based on a partial match. For example, FIG. 7A and FIG. 7B illustrate a scenario that includes a partial match. The partial match scenario of FIG. 7A and FIG. 7B, is not an exact match, because in an exact match there may be different perspectives between the two views of the planar regions, in both the first and second two-dimensional views, but the full region is visible in both views. Thus, for example, matching billboard 610 and billboard 710A would qualify as an exact match because even though the perspective of these two planar regions is different, they clearly each show the exact same billboard in its entirety. There may be an exact match between these two billboards (matching billboard 610 and billboard 710A) and finding the appropriate corner points involves transforming the corner points from annotated two-dimensional corner points into three-dimensional corner points with respect to the model. Then those three-dimensional corner points are transformed appropriately into two-dimensional coordinates for the second view.

Handling a partial match is more complicated, but offers additional power and flexibility. Partial matches are relevant when the perspective difference between the first and second views causes part of the billboard to be occluded. A partial match operates as in the example of FIG. 7A and FIG. 7B, in which part of the billboard is blocked in the second two-dimensional view. In FIG. 7A, a billboard has been annotated. However, only part of the billboard is visible in the two-dimensional view of FIG. 7B. Hence, to determine how to integrate that billboard into FIG. 7B, additional processing is required.

The annotation process often will involve a whole billboard. A partial match begins with an annotated full billboard as in FIG. 7A, and attempts to do a partial match as in FIG. 7B to a portion of that billboard, rather than only beginning with annotations for part of a billboard. However, starting with a whole billboard is not a requirement. It is certainly possible for embodiments to combine information from one or more annotated partial views to provide a new viewpoint of content. Suppose that a billboard is occluded by a tree, for example. In certain embodiments, it is possible to combine different views of the occluded billboard when merging content together. For example, different views may process an image of the left side and an image of the right side of the billboard together. This approach makes it possible to combine the images to provide content for the whole billboard when generating the second two-dimensional view.

Several processing techniques may be part of the partial matching process to help ensure that embodiment obtain useful results. For example, embodiments may generate occlusion masks as part of the partial matching process. Occlusion masks may provide information about which parts of content contained in the first planar region are visible from the second location. These occlusion masks may help to determine whether establishing a partial match is successful.

Occlusion masks may be used in combination with other techniques to ascertain whether a partial match is a sufficiently good match that partial matching is appropriate. For example, establishing a partial match may also involve calculating a match score between the first planar region and the second planar region. Embodiments may establish that a partial match is successful when the match score exceeds a threshold value.

A number of approaches may be used to calculate the match score. For example, one approach to calculating match scores includes dividing the first planar region and the second planar region into constituent pieces. It then becomes possible to compare the pieces of the first planar region to respective pieces of the second planar region to determine an amount of overlap. The match score may then be calculated based on the amount of overlap.

Another approach that some embodiments may use to calculate the match score is comparing the first planar region and the second planar region to determine the largest contiguous area of shared content. The match score can then be calculated based on the amount of contiguous shared content.

Regardless of its derivation, the match score provides information that allows partial matching to function.

CONCLUSION

The disclosed embodiments incorporate a variety of features in new and advantageous ways. They provide for easy and convenient managing of location information for planar regions in two-dimensional views of a three-dimensional environment.

The Summary and Abstract sections may set forth one or more but not all example embodiments as contemplated by the inventor(s), and thus, are not intended to limit the present embodiments and the appended claims in any way.

The present embodiments have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the embodiments that others can, by applying knowledge within the skill of the art, readily modify and/or adapt for various applications such specific embodiments, without undue experimentation, without departing from the general concept of the present embodiments. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present embodiments should not be limited by any of the above-described example embodiments, but should be defined only in accordance with the following claims and their equivalents.

What is claimed is:

1. A computer-implemented method for managing location information for planar regions in two-dimensional views of a three-dimensional environment, the method comprising:
    receiving a request for a first two-dimensional view of the three-dimensional environment, the first two-dimensional view being from a first location within the three-dimensional environment;
    performing, using one or more computing devices, a coordinate transformation on a rendered first two-dimensional view of the three dimensional environment to generate three-dimensional coordinates, the three-dimensional coordinates corresponding to the rendered first two-dimensional view and indicating at least a location of a first planar region within the three-dimensional environment;
    determining, using the one or more computing devices, a distance and a direction between a second location within the three-dimensional environment and the location of the first planar region based at least on the three-dimensional coordinates; and
    providing for display of a second two-dimensional view of the three-dimensional environment, the second two-dimensional view being from the second location in the three-dimensional environment, and being based on the determined distance and direction.

2. The computer-implemented method of claim 1, further comprising identifying the location of the first planar region within the three-dimensional environment based, at least in part, on annotation of an image of the three-dimensional environment.

3. The computer-implemented method of claim 2, wherein identifying is based, at least in part, on annotation of a plurality of images of the three-dimensional environment.

4. A system for managing location information for planar regions in two-dimensional views of a three-dimensional environment, the system comprising:
    a processor;
    a planar region location manager, configured to use the processor to:
        receive a request for a first two-dimensional view of the three-dimensional environment, the first two-dimensional view being from a first location within the three-dimensional environment;
        perform a coordinate transformation on a rendered first two-dimensional view of the three dimensional environment to generate three-dimensional coordinates, the three-dimensional coordinates corresponding to the rendered first two-dimensional view and indicating at least a location of a first planar region within the three-dimensional environment;
        determine a distance and a direction between a second location within the three-dimensional environment and the location of the first planar region based at least on the three-dimensional coordinates; and
        provide for display of a second two-dimensional view of the three-dimensional environment, the second two-dimensional view being from the second location in the three-dimensional environment, and being based on the determined distance and direction.

5. The system of claim 4, wherein the planar region location manager, is further configured to use the processor to allow a user to identify the location of the first planar region within the three-dimensional environment based, at least in part, on annotation of an image of the three-dimensional environment.

6. The system of claim 5, wherein the planar region location manager is further configured to use the processor to allow a user to identify the location of the first planar region within the three-dimensional environment based, at least in part, on annotation of a plurality of images of the three-dimensional environment.

7. A non-transitory computer-readable storage device having instructions stored thereon that, when executed by one or more processors, cause the processors to execute a method for managing location information for planar regions in two-dimensional views of a three-dimensional environment, the method comprising:
    receiving a request for a first two-dimensional view of the three-dimensional environment, the first two-dimensional view being from a first location within the three-dimensional environment;
    performing a coordinate transformation on a rendered first two-dimensional view of the three dimensional environment to generate three-dimensional coordinates, the three-dimensional coordinates corresponding to the rendered first two-dimensional view and indicating at least a location of a first planar region within the three-dimensional environment;
    determining a distance and a direction between a second location within the three-dimensional environment and the location of the first planar region based at least on the three-dimensional coordinates; and
    providing for display of a second two-dimensional view of the three-dimensional environment, the second two-dimensional view being from the second location in the three-dimensional environment, and being based on the determined distance and direction.

8. The computer-readable storage device of claim 7, wherein the method further comprises identifying the location of the first planar region within the three-dimensional environment based, at least in part, on annotation of an image of the three-dimensional environment.

9. The computer-readable storage device of claim 8, wherein identifying is based, at least in part, on annotation of a plurality of images of the three-dimensional environment.

* * * * *